(12) United States Patent
Mobin et al.

(10) Patent No.: US 7,587,640 B2
(45) Date of Patent: Sep. 8, 2009

(54) METHOD AND APPARATUS FOR MONITORING AND COMPENSATING FOR SKEW ON A HIGH SPEED PARALLEL BUS

(75) Inventors: Mohammad S. Mobin, Orefield, PA (US); Gregory W. Sheets, Bangor, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 285 days.

(21) Appl. No.: 11/235,872

(22) Filed: Sep. 27, 2005

(65) Prior Publication Data

US 2007/0074084 A1 Mar. 29, 2007

(51) Int. Cl.
*G11B 20/20* (2006.01)
(52) U.S. Cl. ..................................... 714/700
(58) Field of Classification Search .................. 714/700
See application file for complete search history.

(56) References Cited

U.S. PATENT DOCUMENTS

| | | | | | |
|---|---|---|---|---|---|
| 5,157,530 | A | * | 10/1992 | Loeb et al. | 398/79 |
| 5,384,781 | A | * | 1/1995 | Kawabata | 714/700 |
| 6,031,847 | A | * | 2/2000 | Collins et al. | 370/508 |
| 6,079,035 | A | * | 6/2000 | Suzuki et al. | 714/700 |
| 6,721,916 | B2 | * | 4/2004 | Agazzi et al. | 714/752 |
| 6,944,801 | B2 | * | 9/2005 | Kojima | 714/700 |
| 6,996,738 | B2 | * | 2/2006 | Chiang | 713/503 |
| 7,054,401 | B2 | * | 5/2006 | Kada et al. | 375/355 |
| 7,078,889 | B2 | * | 7/2006 | Oshima | 324/158.1 |
| 7,085,950 | B2 | * | 8/2006 | Ehmann et al. | 713/503 |
| 7,120,838 | B2 | * | 10/2006 | Casper et al. | 714/700 |
| 7,167,995 | B2 | * | 1/2007 | Chiang | 713/503 |
| 7,187,192 | B2 | * | 3/2007 | Oshima et al. | 324/765 |
| 2003/0226070 | A1 | * | 12/2003 | Fukao et al. | 714/700 |
| 2004/0250179 | A1 | * | 12/2004 | Laquai | 714/699 |
| 2005/0127894 | A1 | * | 6/2005 | Wyatt | 324/76.77 |
| 2005/0134306 | A1 | | 6/2005 | Stojanovic et al. | |

* cited by examiner

*Primary Examiner*—James C Kerveros
(74) *Attorney, Agent, or Firm*—Ryan, Mason & Lewis, LLP (57) ABSTRACT

Methods and apparatus are provided for monitoring and compensating for skew on a high speed parallel bus. Delay skew for a plurality of signals on a parallel bus is monitored by obtaining a plurality of samples of the plurality of signals for each unit interval; and identifying a location of transitions in the plurality of signals based on the samples. The samples can be obtained, for example, by sampling the plurality of signals using a plurality of latches and estimating a value of one or more of the plurality of signals by comparing values of the latches. A microprocessor can optionally be employed to determine a relative distribution of transitions in the plurality of signals and to align transitions in the plurality of signals to a common position. The transitions in the plurality of signals can be aligned to a common position by adjusting a delay control setting for a buffer associated with each of the plurality of signals.

20 Claims, 8 Drawing Sheets

METHOD AND APPARATUS FOR MONITORING AND COMPENSATING FOR SKEW ON A HIGH SPEED PARALLEL BUS

FIELD OF THE INVENTION

The present invention is related to techniques for increasing the performance and data throughput of ASIC devices, such as Synchronous Dynamic Random Access Memories (SDRAMs) and, more particularly, to techniques for monitoring and compensating for skew on high speed parallel buses in such ASIC devices.

BACKGROUND OF THE INVENTION

As the performance and data throughput requirements for networking and computing applications increase, the performance and data throughput requirements for many of the required individual subsystems also increase. Transferring data between the main memory and the system processor, for example, is often a significant performance bottleneck in any computing system. Even the fastest standard Dynamic Random Access Memory (DRAM) cannot keep up with the ever increasing bus speeds used on many computing systems.

Synchronous Dynamic RAM (SDRAM) is a type of DRAM that demonstrates improved performance and data throughput. While DRAM has an asynchronous interface (i.e., it immediately reacts to changes in its control inputs), SDRAM has a synchronous interface (i.e., it waits for a clock pulse before responding to its control inputs). Likewise, Double Data Rate (DDR) SDRAM is a further evolution of SDRAM that is used in many computing systems. As originally proposed, SDRAM acts on only the rising edge of the clock signal (i.e., each low-to-high transition). DDR SDRAM, on the other hand, acts on both the rising and falling edges, thereby potentially increasing the data rate by a factor of two. Further performance improvements are obtained in DDR-2 (2×) and QDR-2 (4×) by phase shifting the clock signal to obtain additional rising and falling edges.

SDRAM enjoys wide spread application in both low-end consumer computing applications, as well as in high end networking switches and routers. Currently, the data throughput (i.e., the speed) of SDRAM is limited by a delay skew spread of the parallel bus that carries the parallel data that is being read from or written to the memory. Generally, in the presence of a delay skew spread, the rising and falling edges of the data signals on the parallel bus are not aligned. The skew spread is often attributed to variations in process, voltage, temperature or aging (PVTA).

A need therefore exists for methods and apparatus for monitoring and compensating for skew on high speed parallel buses in SDRAM and other ASIC devices. A further need exists for a microprocessor-based I/O skew controlling technique.

SUMMARY OF THE INVENTION

Generally, methods and apparatus are provided for monitoring and compensating for skew on a high speed parallel bus. According to one aspect of the invention, delay skew for a plurality of signals on a parallel bus is monitored by obtaining a plurality of samples of the plurality of signals for each unit interval; and identifying a location of transitions in the plurality of signals based on the samples. The samples can be obtained, for example, by sampling the plurality of signals using a plurality of latches and estimating a value of one or more of the plurality of signals by comparing values of the latches.

A microprocessor can optionally be employed to determine a relative distribution of transitions in the plurality of signals and to align transitions in the plurality of signals to a common position. For example, the transitions in the plurality of signals can be aligned to a common position by adjusting a delay control setting for a buffer associated with each of the plurality of signals.

A more complete understanding of the present invention, as well as further features and advantages of the present invention, will be obtained by reference to the following detailed description and drawings.

DETAILED DESCRIPTION

The present invention provides microprocessor-based methods and apparatus for monitoring and compensating for skew on high speed parallel buses in SDRAM and other ASIC devices. The disclosed skew equalization techniques allow the data throughput of a parallel bus to be increased. According to another aspect of the invention, a skew equalizer is provided that can account for process, voltage, temperature or aging (PVTA) variations.

Figure 1:
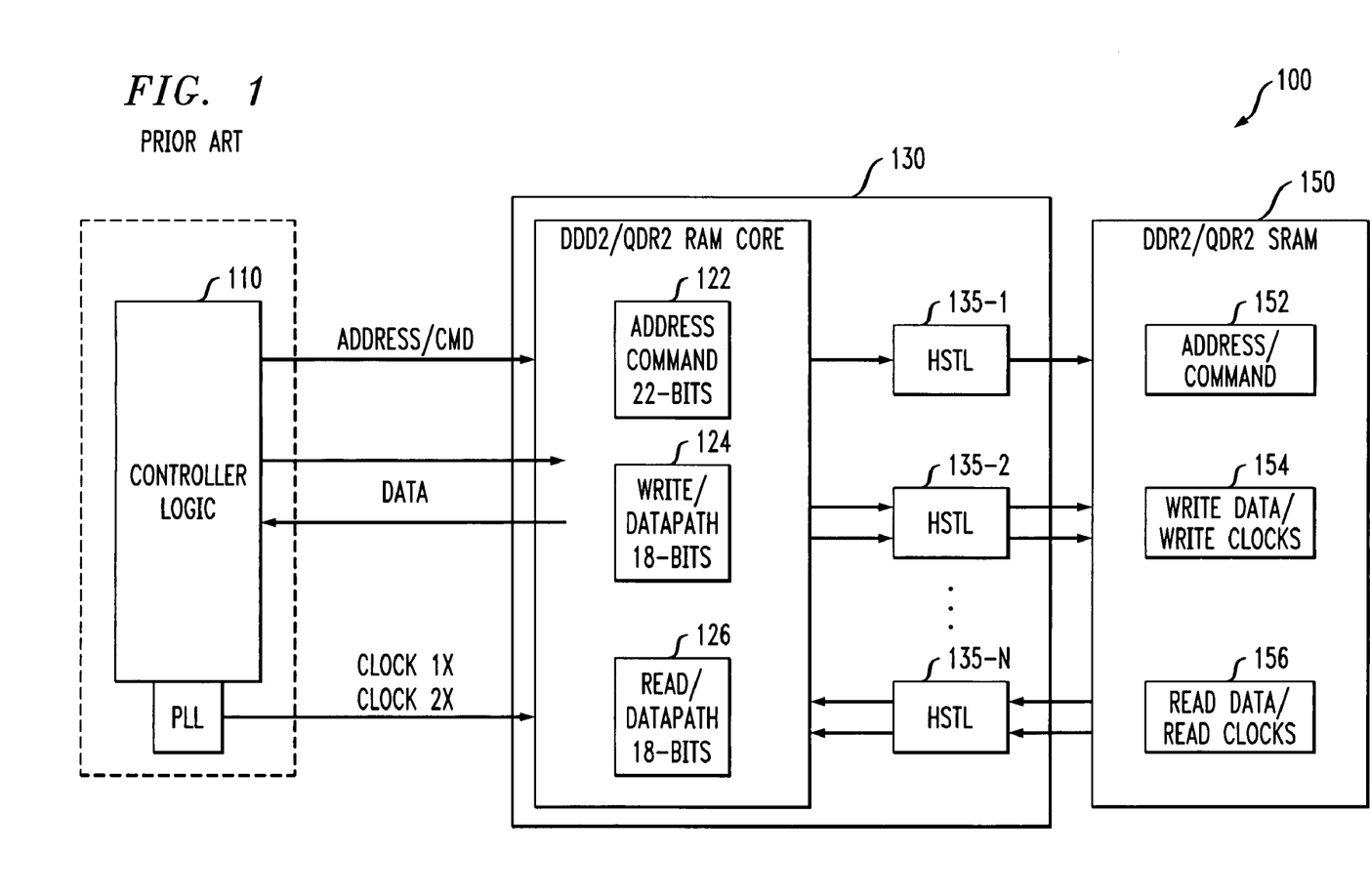
FIG. 1 is a schematic block diagram of a conventional DDR SDRAM.

FIG. 1 is a schematic block diagram of a conventional DDR SDRAM 100. As the number of physical input/output pins (I/Os) on an Application Specific Integrated Circuit (ASIC) increases beyond a practical limit, it often becomes necessary to split the functionality of a single ASIC into multiple ASICs. As shown in FIG. 1, the functionality for the exemplary SDRAM is split among a controller ASIC 110, a macro ASIC 130 and the SRAM ASIC 150. The controller logic on the ASIC 110 generates commands to read and write data from the SRAM 150. In addition, the ASIC 110 includes a phase locked loop (PLL) that generates a clock signal that controls the timing of the DDR SDRAM 100. The macro ASIC 130 provides communication between the separate controller and SRAM ASICs 110, 150, in a known manner.

In operation, the macro 130 aggregates communications between the ASICs 110, 150 into one or more high speed ASIC to ASIC Bus that connects the two ASICs 110, 150. In the exemplary implementation shown in FIG. 1, the macro 130 comprises sub-macros 122, 124, 126 for aggregating address/command, write data and read data, respectively, onto a bus. It is noted that the write data and read data can be transferred on separate uni-directional buses as shown in FIG. 1, or on a single bi-directional bus. In addition, the macro 130 comprises high speed transceiver logic (HSTL) 135-1 through 135-3 for driving each of the buses.

As shown in FIG. 1, the SRAM ASIC 150 comprises macros 152, 154, 156, for processing the address/command, write data (and clocks) and read data (and clocks), respectively.

As discussed further below in conjunction with FIG. 2, the DDR SDRAM 100 is known to exhibit a delay skew spread on the parallel bus that carries the parallel data that is being read from or written to the memory. In the presence of a delay skew spread, the rising and falling edges of the data signals on the parallel buses are not aligned. The skew spread is often attributed to variations in process, voltage, temperature or aging (PVTA) of buffers in the HSTL 135.

It is noted that SDRAMs, such as the SDRAM 100 shown in FIG. 1, are often employed in computing systems, for example, on a computer motherboard, as well as in many networking applications.

Figure 2:
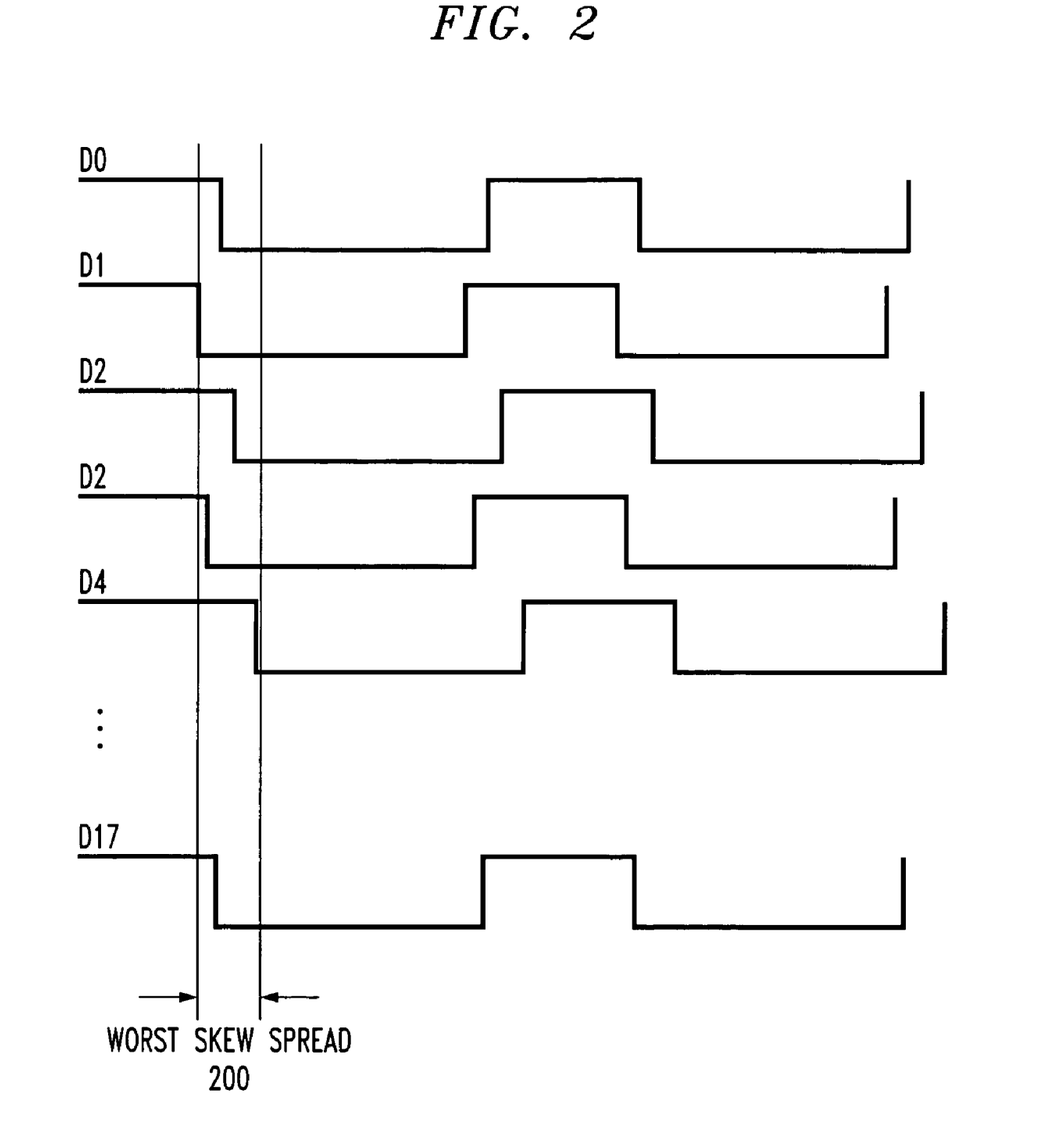
FIG. 2 illustrates exemplary data signals D0 through D17 on a parallel bus of the SDRAM of FIG. 1.

FIG. 2 illustrates exemplary data signals D0 through D17 on a parallel bus of the SDRAM 100 of FIG. 1. While it is desirable for the falling edge (as well as the rising edge) for each data signal D0 through D17 to be aligned, the edges are skewed due to PVTA variations. The worst skew spread 200 is shown in FIG. 2. As discussed hereinafter, the present invention provides methods and apparatus for monitoring the skew on a high speed parallel bus and for compensating for the skew such that the edges are aligned.

Figure 3:
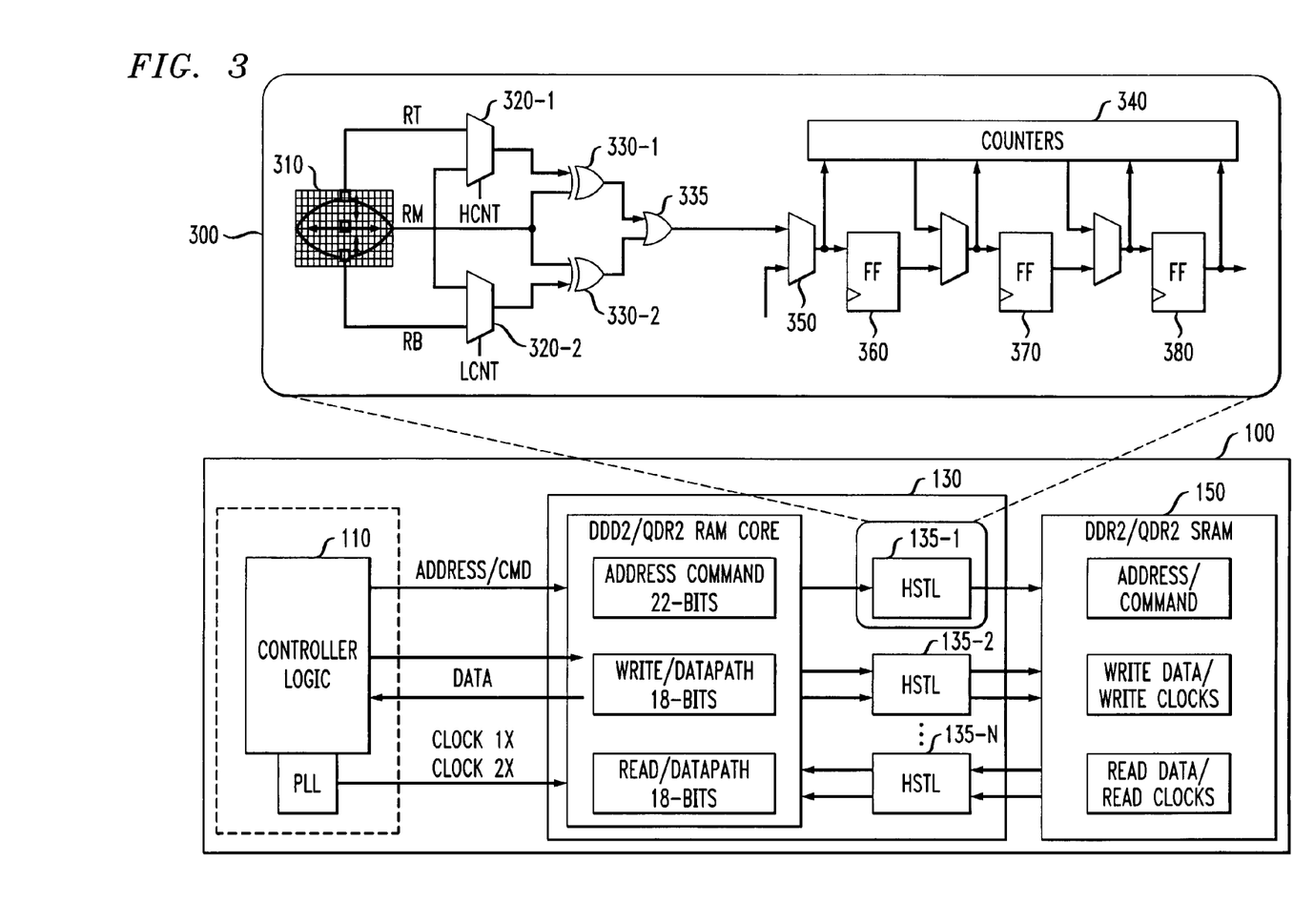
FIG. 3 is a schematic block diagram of the DDR SDRAM, as modified herein to incorporate the features and functions of the present invention.
Figure 8:
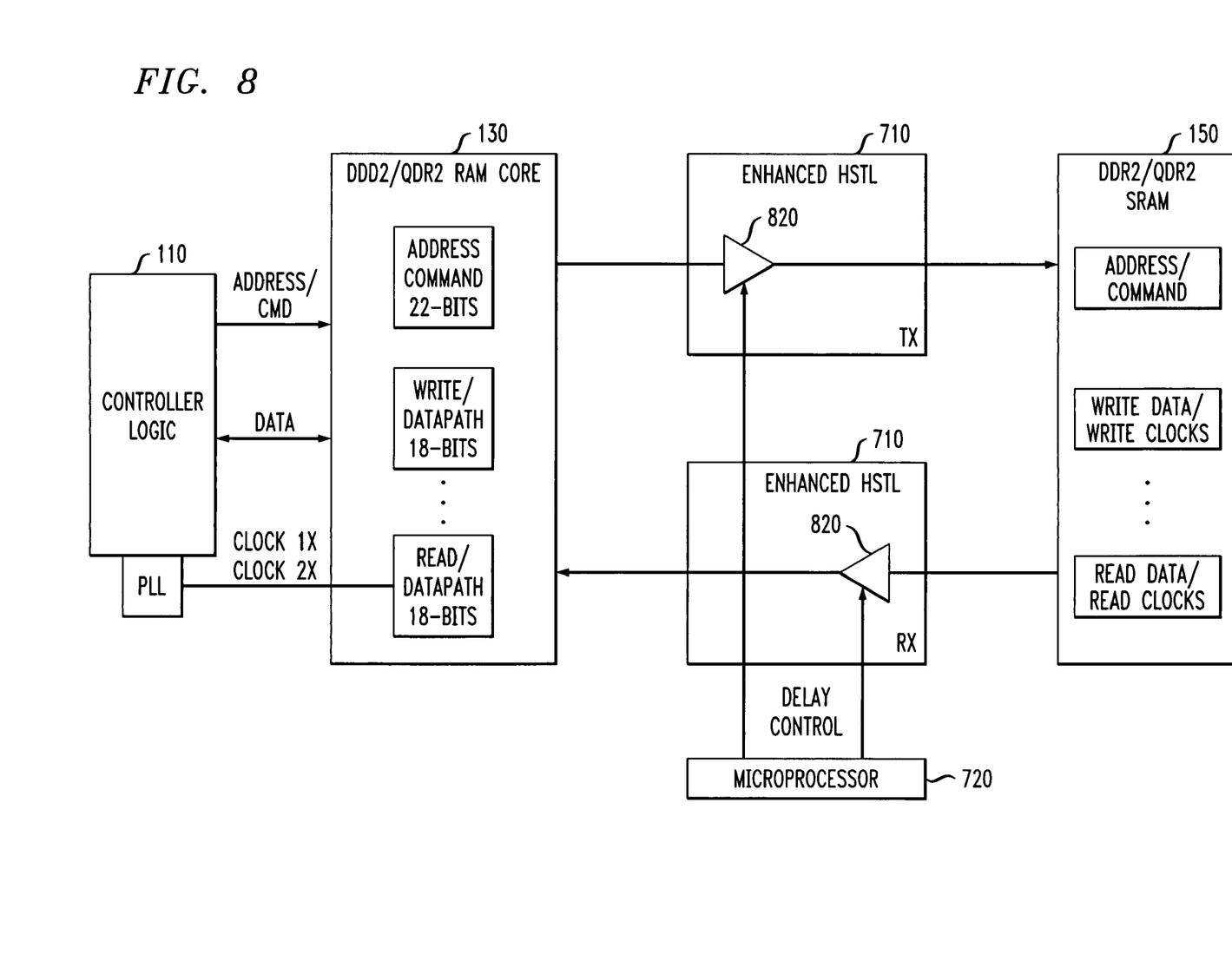
FIG. 8 is a schematic block diagram of a skew compensation system incorporating features of the present invention.

FIG. 3 is a schematic block diagram of the DDR SDRAM 100, as modified herein to incorporate the features and functions of the present invention. As shown in FIG. 3, the functionality for the exemplary SDRAM 100 is split among a controller ASIC 110, a macro ASIC 130 and the SRAM ASIC 150, in the same manner as discussed above in conjunction with FIG. 1. The macro ASIC 130 and the SRAM ASIC 150 operate in the same manner as discussed above in conjunction with FIG. 1. As shown by the expanded view 300 in FIG. 3, the HSTL circuitry 135 is modified in accordance with the present invention to provide skew equalization. It is noted that FIG. 3 illustrates the measurement of the delay skew while FIG. 8 illustrates an exemplary skew correction scheme.

The HSTL 300 comprises a pair of roaming multiplexers 320-1 and 320-2 for measuring the data signal eye. The exemplary roaming multiplexers 320-1 and 320-2 obtain three samples, roaming top (RT), roaming middle (RM) and roaming bottom (RB), obtained by sampling the eye with controlled sampling time and threshold settings, shown by grid 310. The roaming multiplexers 320-1 and 320-2 are controlled by count control signals HCNT and LCNT, as discussed further below in conjunction with FIGS. 4 and 5.

The outputs of the roaming multiplexers 320 are applied to a pair of exclusive OR (XOR) gates 330-1, 330-2, in the manner shown in FIG. 3. A first XOR gate 330-1 compares the value of the center latch RM to the value of the top latch RT. If the values of the center latch RM and top latch RT match, the XOR gate 330-1 will generate a binary value of 0 and if the values of the center latch RM and top latch RT do not match, the XOR gate 330-1 will generate a binary value of 1, in a known manner. Thus, a "hit" occurs for points above the zero crossing when the values of the center latch RM and top latch RT do not match.

Likewise, a second XOR gate 330-2 compares the value of the center latch RM to the value of the bottom latch RT. If the values of the center latch RM and bottom latch RB match, the XOR gate 330-2 will generate a binary value of 0 and if the values of the center latch RM and bottom latch RB do not match, the XOR gate 330-2 will generate a binary value of 1, in a known manner. Thus, a "hit" occurs for points below the zero crossing when the values of the center latch RM and bottom latch RB do not match.

As shown in FIG. 3, the exemplary skew equalization system 300 includes one or more counters 340 for counting the "hit rate" for points above and below the zero crossing, respectively. It is noted that a single shared counter can be employed to count the "hit rate" for points above and below the zero crossing, as would be apparent to a person of ordinary skill in the art. In the exemplary embodiment of FIG. 3, a 3 bit counter is obtained using three flip flops 360, 370, 380. The operation of the counter 340 and flip flops 360, 370, 380 is discussed further below in conjunction with FIG. 7. As discussed hereinafter, the count generated by the counter 340 allows the relative location of each edge to be identified. Generally, the count will be 0 until the crossing point that identifies a rising or falling edge. In this manner, the edges on each data line D0 through D17 can be calculated and aligned to a common position.

For example, roaming latch RM can be set at a threshold 0 and time $t_0$. Roaming latches RT and RB can be set at a threshold of +/−4 and time $t_i$ over the time axis. The eye cross-over calculated using the above counter for different bits, $d_0$ through $d_{17}$, indicates the skew spread.

Figure 4:
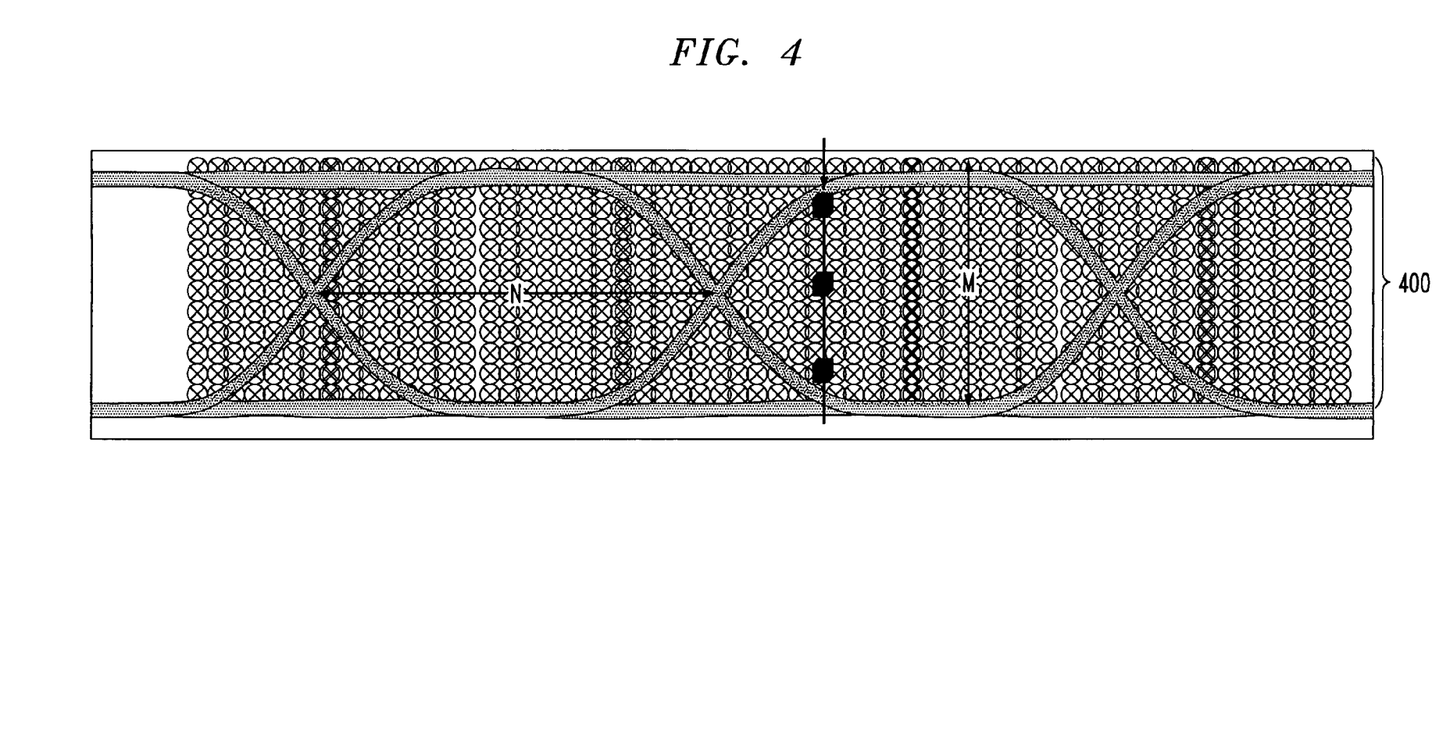
FIG. 4 illustrates the monitoring of a data signal in accordance with one embodiment of the present invention.

FIG. 4 illustrates the monitoring of a data signal in accordance with one embodiment of the present invention. As shown in FIG. 4, the three roaming latches RT, RM and RB of FIG. 3 can be programmed to move horizontally and vertically to provide N×M roaming latch options, with N latch time setting options per data eye having a time orientation (e.g., horizontal) and M latch threshold setting options per data eye having a voltage orientation (e.g., vertical). In this manner, the data signal can be sampled over N×M positions to obtain an accurate visualization of the transitions. In one exemplary embodiment, there are N=64 steps in the horizontal direction and M=128 steps in the vertical direction (64 steps above the zero crossing and 64 steps below the zero crossing).

Figure 5:
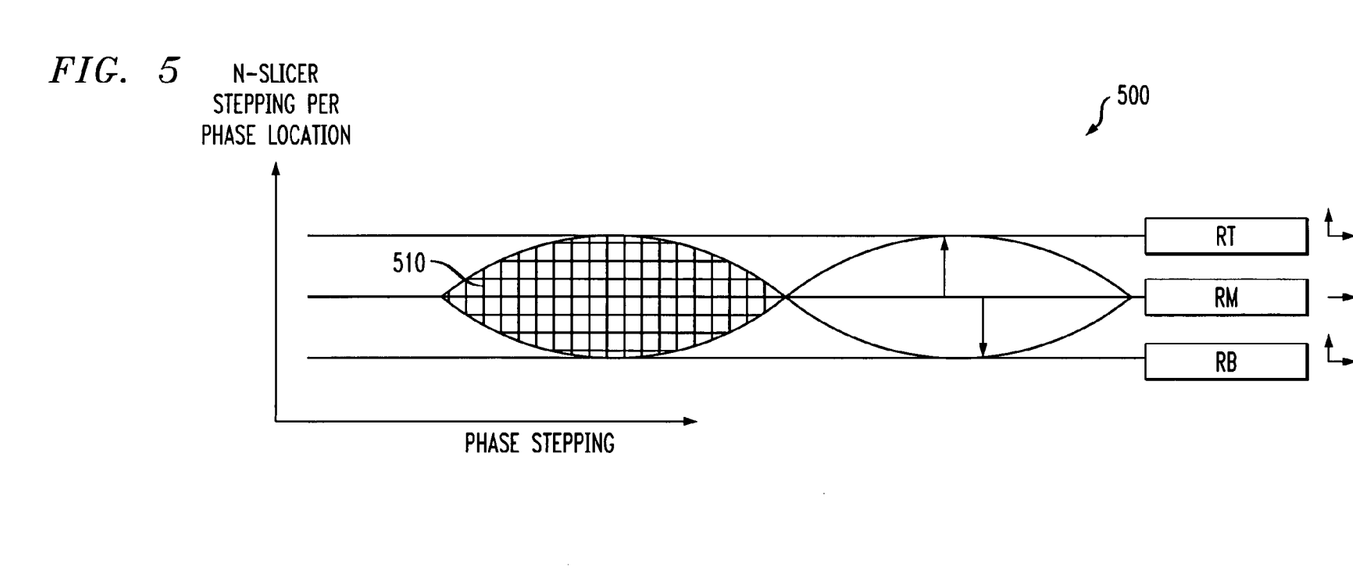
FIG. 5 illustrates the sampling of the data signal by the roaming latches RT, RM and RB of FIG. 3, in further detail.

FIG. 5 illustrates the sampling of the data signal by the roaming latches RT, RM and RB, in further detail. As previously indicated, roaming three latches RT, RM and RB can be programmed horizontally to move left and right with N taps per data eye (for example, by interpolating the phase outputs). In addition, the zero cross center latch RM is always fixed in a vertical direction, for example, at the zero cross, as shown in FIG. 5. The top and bottom roaming latches RT and RB can move up and down in a vertical direction from the zero cross RM by programming a variable threshold voltage input to each latch with M voltage levels.

Thus, whether or not the value of the center latch RM matches the value of the top and bottom latches, RT and RB, provides an indication of location of the data transitions (rising and/or falling edges). If the center latch RM has the same value as the top latch RT, they are said to match. Thus, for samples taken inside a data eye, such as the data eye 510, it would be expected that the value of the center latch RM matches the value of the top and bottom latches, RT and RB. For samples taken along the boundary of the data eye, such as the data eye 510, it would be expected that some of the values of the center latch RM will match some of the values of the top and bottom latches, RT and RB. For samples taken outside a data eye, such as the data eye 510, it would be expected that the value of the center latch RM will not match the value of the top and bottom latches, RT and RB.

Figure 6:
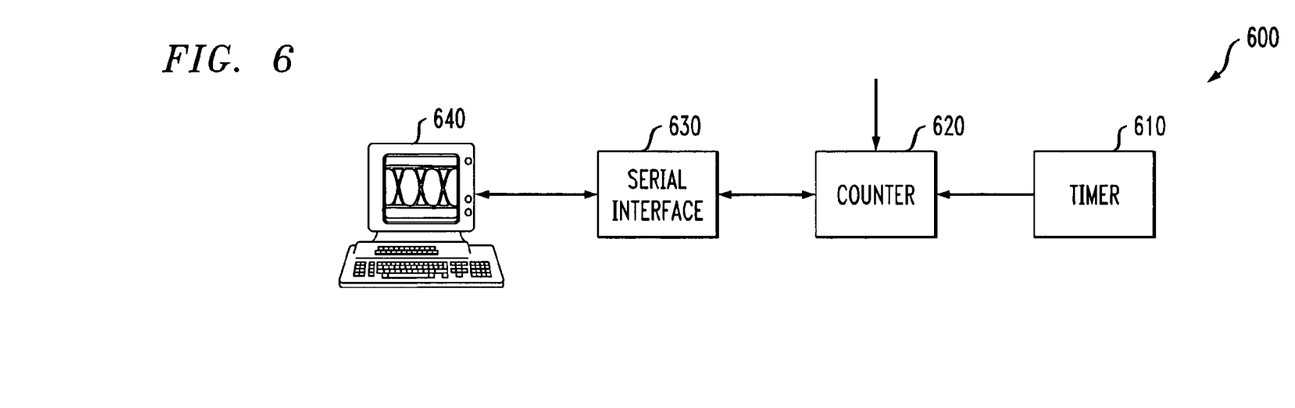
FIG. 6 is a schematic block diagram illustrating a test control system for monitoring the skew of a parallel bus.

FIG. 6 is a schematic block diagram illustrating a test control system 600 for monitoring the skew of a parallel bus. In one exemplary implementation, for each of the N horizontal positions associated with a given eye, the roaming latches RT, RM and RB are stepped through each of the M vertical levels to obtain the data eye samples. For each position in the N×M array of sampled locations, the respective values of the roaming latches RT, RM and RB are evaluated for a predefined duration, controlled by a timer 610. In one exemplary implementation, for each position in the N×M array of sampled locations, a counter 620 counts the number of mismatches during the predefined duration between the center latch RM and the top and bottom latches, RT and RB. The count metric generated by the counter 620 is provided, for example, via a serial interface 630 to a computing device 640, such as a personal computer or an 8051 microprocessor, for further analysis.

Generally, once the data for the N×M points is loaded into the computing device 640, the data can be analyzed and the skew can be calculated and equalized by controlling individual bit line delay. For a given position in the N×M array of sampled locations, the hit rate can be defined, for example, as the number of mismatches during the predefined duration between the center latch RM and the top or bottom latch, RT, RB, associated with the position. For example, if a given position is above the zero crossing point, the value of the center latch RM is compared to the value of the top latch, RT.

Figure 7:
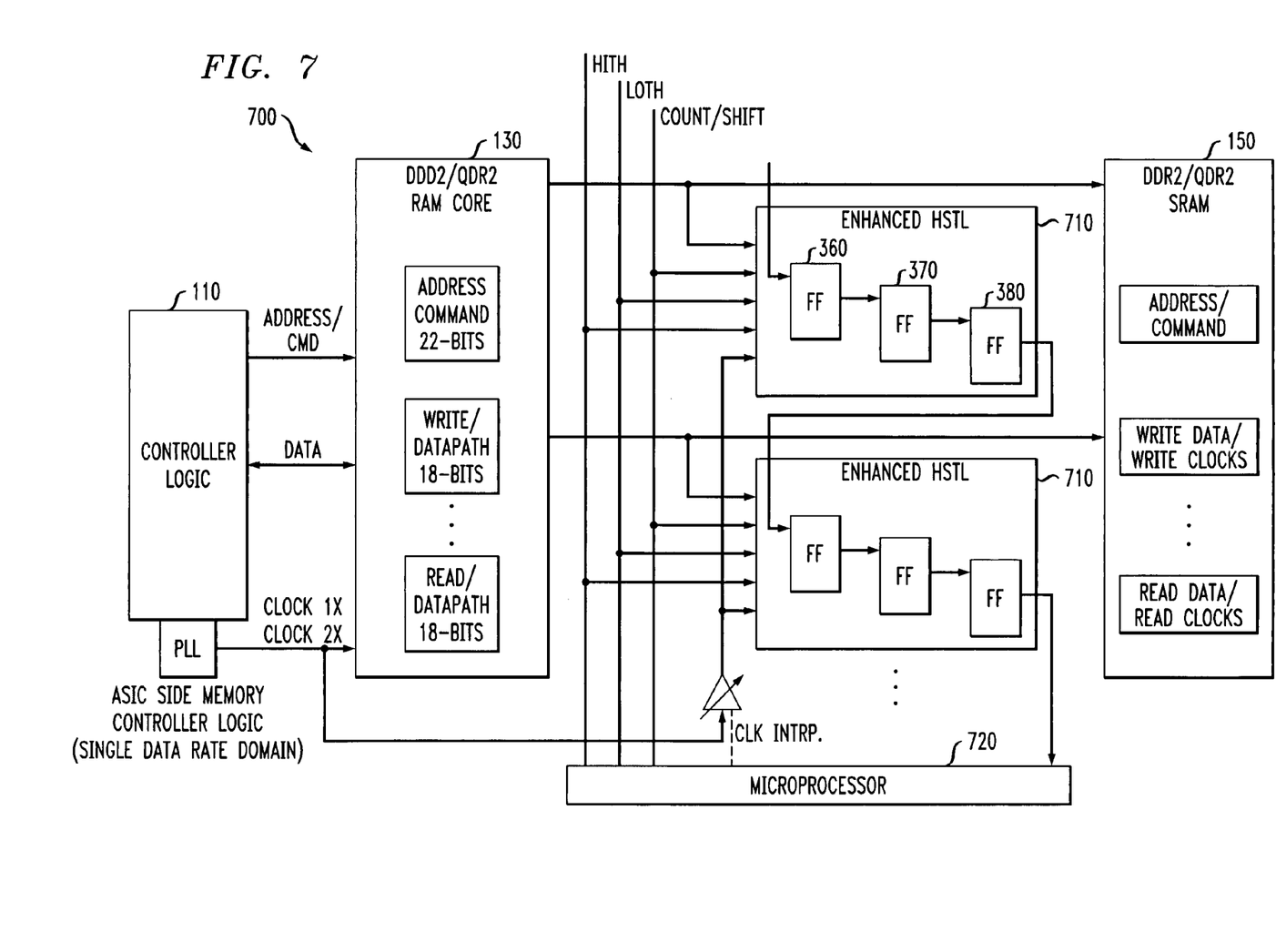
FIG. 7 is a schematic block diagram of a skew monitoring system incorporating features of the present invention.

FIG. 7 is a schematic block diagram of a skew equalization system 700 incorporating features of the present invention. As shown in FIG. 7, the functionality for the exemplary SDRAM 100 is split among a controller ASIC 110, a macro ASIC 130 and the SRAM ASIC 150, in the same manner as discussed above in conjunction with FIG. 1. The macro ASIC 130 and the SRAM ASIC 150 operate in the same manner as discussed above in conjunction with FIG. 1. The HSTL circuitry 135 is modified in accordance with the present invention to provide skew calculation. As shown in FIG. 7, the flip flops 360, 370, 380 of the hit counter associated with each enhanced HSTL 710 in an exemplary embodiment are chained together, in order to read out the counter values.

The skew equalization system 700 also includes a microprocessor 720 to control the skew equalization processes of the present invention. The microprocessor 720 generates a number of control signals that control the skew calculation processes. The microprocessor 720 generates low and high threshold signals, LOTH and HITH, that control the vertical sampling points of the roaming latches RB and RT, respectively, and time delay control.

In addition, the microprocessor 720 generates a count/shift signal that controls whether the flip flops 360, 370, 380 are in a count mode or a shift mode. In a count mode, the flip flops 360, 370, 380 count the number of mismatches between the various roaming latches, RT, RM and RB, in the manner discussed above. In a shift mode, the count values from each flip flop 360, 370, 380, for each data signal, D0 through D17, is serially shifted and read by the microprocessor 720. By controlling the position of the roaming latches, RT, RM and RB, the microprocessor 720 can process the count values to identify the location of the rising and/or falling edges of the data signals, D0 through D17.

In this manner, the microprocessor 720 can align the rising and/or falling edges of each data signal, D0 through D17, to a selected time line. Generally, the edges are aligned by varying the delay of each buffer in the enhanced HSTL 710 for each data signal, D0 through D17 of FIG. 8.

In one implementation shown in FIG. 8, the edges can be aligned to a far right location within the skew window 200 (FIG. 2) (i.e., delaying the signal) by increasing the delay control value of each buffer 820 in the enhanced HSTL 710 for each data signal, D0 through D17, until they are all aligned. For example, data signal D0 requires a slight increase in the delay setting, while data signal D4 requires a slightly smaller increase in the delay setting. Likewise, to align the edges to a far left location within the skew window 200 (FIG. 2) (i.e., advancing the signal), the delay control value of each buffer 820 is decreased. The delay control value is adjusted by the microprocessor 720, based on the count values that identify the location of the rising and/or falling edges, as would be apparent to a person of ordinary skill in the art. Delays can also be aligned to a desired position between the left and right location of the delay window.

It is noted that the enhanced HSTL bank 710 can be marketed as a separate application specific integrated circuit (ASIC), as shown in FIG. 8, or integrated with either the macro ASIC 130 or the SRAM ASIC 150.

Figure 9:
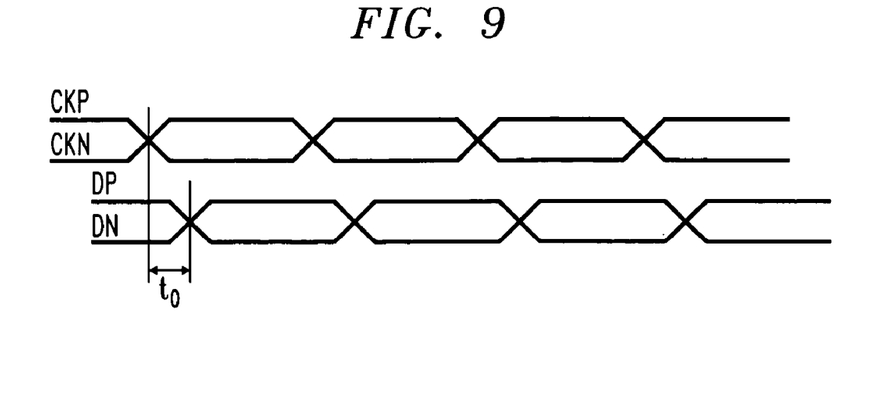
FIG. 9 illustrates the measurement of a static phase offset according to one embodiment of the present invention.

According to one aspect of the invention, shown in FIG. 9, the skew monitoring capabilities of the present invention allow the static phase offset of a signal to be monitored, as follows:

$$\text{static phase offset } t0 = \frac{\sum_{i=0}^{N-1} T0_i}{N}.$$

Generally, the static phase offset measures the delay between rising (or falling) edges on adjacent data lines.

Figure 10:
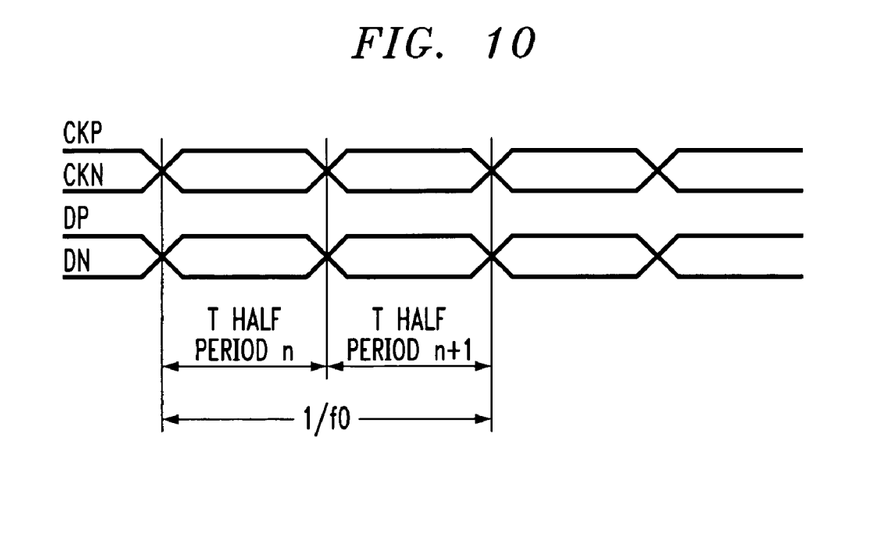
FIG. 10 illustrates the measurement of a half period jitter according to one embodiment of the present invention.

According to another aspect of the invention, shown in FIG. 10, the skew monitoring capabilities of the present invention allow the half period jitter of a signal to be monitored, as follows:

half period jitter $t_{JH} = t\_\text{half\_period}_n - 1/(2*f0)$.

Generally, the half period jitter measures the delay between adjacent rising and falling edges (or vice versa) on a given data line.

Figure 11:
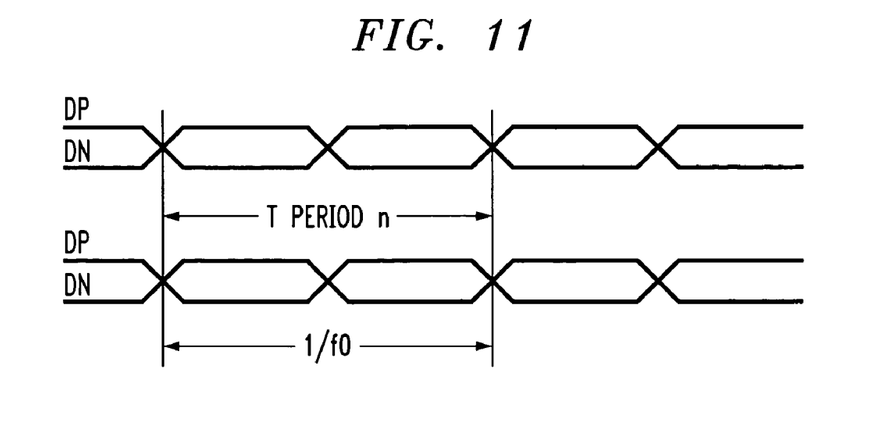
FIG. 11 illustrates the measurement of a periodic jitter according to one embodiment of the present invention.

According to yet another aspect of the invention, shown in FIG. 11, the skew monitoring capabilities of the present invention allow the periodic jitter of a signal to be monitored, as follows:

periodic jitter $t_p = t\_\text{period}_n - 1/f0$.

Generally, the periodic jitter measures the delay between adjacent rising (or falling) edges on a given data line.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for monitoring a delay skew for a plurality of signals on a parallel bus, comprising:
    obtaining a plurality of samples of said plurality of signals for each unit interval;

identifying a location of transitions in said plurality of signals based on said samples;

determining one or more boundaries of one or more data eyes utilizing a plurality of roaming latches, wherein each roaming latch samples one of said plurality of signals utilizing one or more threshold voltages and two or more phases of a clock signal; and evaluating said delay skew based on a phase distribution over time of said transitions.

2. The method of claim 1, wherein said determining step further comprises the step of estimating a value of one or more of said plurality of signals by comparing values of said plurality of roaming latches.

3. The method of claim 2, wherein said plurality of roaming latches sample said plurality of signals by sampling said plurality of signals for N steps within a unit interval.

4. The method of claim 3, wherein said clock signal is generated by a phase locked loop.

5. The method of claim 2, wherein said plurality of roaming latches sample said plurality of signals by sampling said plurality of signals for M threshold voltages.

6. The method of claim 1, further comprising the step of collecting statistics on said plurality of signals.

7. The method of claim 1, further comprising the step of aligning transitions in said plurality of signals to a common position.

8. The method of claim 7, wherein said step of aligning transitions in said plurality of signals to a common position further comprises the step of adjusting a delay control setting for a buffer associated with each of said plurality of signals.

9. The method of claim 1, further comprising the steps of:

determining a match count value for a plurality of time steps in each of said unit intervals, wherein said match count value is obtained by comparing at least two of said samples for a given time step; and processing said match count values to determine said phase distribution of said transitions in said plurality of signals.

10. A circuit for monitoring a delay skew for a plurality of signals on a parallel bus, comprising:

a plurality of roaming latches for obtaining a plurality of samples of said plurality of signals for each unit interval;

a microprocessor for identifying a location of transitions in said plurality of signals based on said samples; for determining one or more boundaries of one or more data eyes utilizing said plurality of roaming latches, wherein each roaming latch samples one of said plurality of signals utilizing one or more threshold voltages and two or more phases of a clock signal; and for evaluating said delay skew based on a phase distribution over time of said transitions.

11. The circuit for monitoring a delay skew of claim 10, wherein said samples are obtained by sampling said plurality of signals using said plurality of roaming latches and estimating a value of one or more of said plurality of signals by comparing values of said roaming latches.

12. The circuit for monitoring a delay skew of claim 10, wherein said microprocessor is further configured to collect statistics on said plurality of signals.

13. The circuit for monitoring a delay skew of claim 10, wherein said microprocessor is further configured to align transitions in said plurality of signals to a common position.

14. The circuit for monitoring a delay skew of claim 13, wherein said transitions in said plurality of signals are aligned to a common position by adjusting a delay control setting for a buffer associated with each of said plurality of signals.

15. The circuit for monitoring a delay skew of claim 10, wherein said microprocessor is further configured to:

determine a match count value for a plurality of time steps in each of said unit intervals, wherein said match count value is obtained by comparing at least two of said samples for a given time step; and process said match count values to determine said phase distribution of said transitions in said plurality of signals.

16. An integrated circuit, comprising:

a circuit for monitoring a delay skew for a plurality of signals on a parallel bus, comprising:

a plurality of roaming latches for obtaining a plurality of samples of said plurality of signals for each unit interval;

a microprocessor for identifying a location of transitions in said plurality of signals based on said samples; determining one or more boundaries of one or more data eyes utilizing said plurality of roaming latches, wherein each roaming latch samples one of said plurality of signals utilizing one or more threshold voltages and two or more phases of a clock signal; and for evaluating said delay skew based on a phase distribution over time of said transitions.

17. The integrated circuit of claim 16, wherein said samples are obtained by sampling said plurality of signals using said plurality of roaming latches and estimating a value of one or more of said plurality of signals by comparing values of said roaming latches.

18. The integrated circuit of claim 16, wherein said microprocessor is further configured to align transitions in said plurality of signals to a common position.

19. The integrated circuit of claim 18, wherein said transitions in said plurality of signals are aligned to a common position by adjusting a delay control setting for a buffer associated with each of said plurality of signals.

20. The integrated circuit of claim 16, wherein said microprocessor is further configured to:

determine a match count value for a plurality of time steps in each of said unit intervals, wherein said match count value is obtained by comparing at least two of said samples for a given time step; and process said match count values to determine said phase distribution of said transitions in said plurality of signals.

* * * * *